United States Patent
Kohrs et al.

(10) Patent No.: US 12,139,028 B2
(45) Date of Patent: Nov. 12, 2024

(54) CHARGE ADAPTERS FOR ELECTRIFIED VEHICLE CHARGING SYSTEMS

(71) Applicant: FORD GLOBAL TECHNOLOGIES, LLC, Dearborn, MI (US)

(72) Inventors: Lori Christine Kohrs, Dearborn, MI (US); Shevon Vannitamby, Farmington Hills, MI (US); Chris Michael Kava, Livonia, MI (US); Michael Padgett, Garden City, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 327 days.

(21) Appl. No.: 17/545,498

(22) Filed: Dec. 8, 2021

(65) Prior Publication Data

US 2023/0173931 A1  Jun. 8, 2023

(51) Int. Cl.
*B60L 53/16* (2019.01)
*B60L 53/18* (2019.01)
*H01R 31/06* (2006.01)
*H02J 7/00* (2006.01)

(52) U.S. Cl.
CPC .............. *B60L 53/16* (2019.02); *B60L 53/18* (2019.02); *H01R 31/06* (2013.01); *H02J 7/0045* (2013.01); *H01R 2201/26* (2013.01)

(58) Field of Classification Search
CPC ......... B60L 53/16; B60L 53/18; H01R 31/06; H01R 2201/26; H02J 7/0045
USPC ........................................................ 320/109
See application file for complete search history.

(56) References Cited

U.S. PATENT DOCUMENTS

| | | | |
|---|---|---|---|
| 8,994,327 B2 * | 3/2015 | Kusch .................... | B60L 53/14 320/109 |
| 10,471,838 B2 | 11/2019 | Rajaie et al. | |
| 10,967,746 B2 | 4/2021 | Hiroe | |
| 11,084,388 B2 | 8/2021 | Nguyen et al. | |
| 11,117,483 B2 | 9/2021 | Kava et al. | |
| 11,705,749 B2 * | 7/2023 | Newman ............... | H02J 7/0063 320/124 |
| 11,710,975 B2 * | 7/2023 | Varughese ............. | B60L 58/21 320/104 |
| 2012/0038324 A1 * | 2/2012 | Humphrey ............. | B60L 53/62 320/138 |
| 2012/0181983 A1 * | 7/2012 | Khan ..................... | B60L 53/14 320/109 |
| 2012/0249065 A1 * | 10/2012 | Bissonette ........... | B60L 53/665 320/109 |

(Continued)

FOREIGN PATENT DOCUMENTS

| | | | | |
|---|---|---|---|---|
| CN | 113199963 A | * | 8/2021 | ............. B60L 50/64 |
| DE | 102019114699 A1 | * | 2/2020 | ............. B60L 50/60 |

(Continued)

*Primary Examiner* — Suresh Memula
(74) *Attorney, Agent, or Firm* — David B. Kelley; Carlson, Gaskey & Olds, P.C.

(57) ABSTRACT

Electrified vehicle charging systems may be equipped with multiple charging interfaces. An exemplary charging system may include a charge adapter for allowing a single charge plug/connector/coupler to be split into multiple charge plugs/connectors/couplers for simultaneously utilizing each charging interface for charging a traction battery pack of the electrified vehicle. Use of the charge adapter can reduce charging times when only a single charge plug is available at a charging station.

17 Claims, 4 Drawing Sheets

(56) References Cited

U.S. PATENT DOCUMENTS

| | | | | |
|---|---|---|---|---|
| 2013/0307489 | A1* | 11/2013 | Kusch | B60L 58/20 |
| | | | | 320/167 |
| 2019/0148954 | A1* | 5/2019 | Jeong | H02J 7/0014 |
| | | | | 320/106 |
| 2020/0122593 | A1 | 4/2020 | Noh et al. | |
| 2020/0406777 | A1* | 12/2020 | Nguyen | B60L 53/35 |
| 2022/0393491 | A1* | 12/2022 | Zhang | H02J 7/0013 |
| 2023/0033955 | A1* | 2/2023 | Seroff | B60L 53/11 |
| 2023/0170732 | A1* | 6/2023 | Cronin | B60L 53/51 |
| | | | | 320/101 |

FOREIGN PATENT DOCUMENTS

| | | | | |
|---|---|---|---|---|
| KR | 20210082763 A | * | 7/2021 | |
| KR | 20220000239 U | * | 1/2022 | |
| WO | WO-2016156278 A1 | * | 10/2016 | B60L 11/1818 |
| WO | WO-2021003099 A1 | * | 1/2021 | B60L 53/11 |

* cited by examiner

CHARGE ADAPTERS FOR ELECTRIFIED VEHICLE CHARGING SYSTEMS

TECHNICAL FIELD

This disclosure relates generally to electrified vehicles, and more particularly to charging systems that include charge adapters for charging electrified vehicles through multiple charging interfaces.

BACKGROUND

Electrified vehicles differ from conventional motor vehicles because they are selectively driven by one or more traction battery pack powered electric machines. The electric machines can propel the electrified vehicles instead of, or in combination with, an internal combustion engine.

Some electrified vehicles, such as plug-in hybrid electric vehicles (PHEVs) and battery electric vehicles (BEVs), include a charge port that is connectable to a coupler of an electric vehicle supply equipment (EVSE) for charging the traction battery pack. A user is typically limited to plugging a single coupler into the vehicle charge port at a time.

SUMMARY

A charging system for an electrified vehicle according to an exemplary aspect other present disclosure includes, among other things, a traction battery pack including a first partition and a second partition, a first charge port assembly including a first inlet port operably connected to the first partition, a second charge port assembly including a second inlet port operably connected to the second partition, and a charge adapter including a first charge coupler adapted to connect to the first inlet port and a second charge coupler adapted to connect to the second inlet port.

In a further non-limiting embodiment of the foregoing charging system, the first partition includes a first battery array and the second partition includes a second battery array.

In a further non-limiting embodiment of either of the foregoing charging systems, an electrical divider system is configured to divide the traction battery pack into the first partition and the second partition. The first partition and the second partition are separately chargeable and electrically isolated from one another when divided by the electrical divider system.

In a further non-limiting embodiment of any of the foregoing charging systems, a charge control module is programmed to command the electrical divider system to transition between a first state in which the first partition and the second partition are coupled and a second state in which the first partition and the second partition are decoupled.

In a further non-limiting embodiment of any of the foregoing charging systems, the charge control module is further programmed to determine an amount of charge current being received from an external power source and to split the charge current received from the external power source evenly between the first partition and the second partition.

In a further non-limiting embodiment of any of the foregoing charging systems, the charge control module is further programmed to command the electrical divider system to transition from the second state to the first state when the first partition and the second partition are charged to a predefined charging capacity.

In a further non-limiting embodiment of any of the foregoing charging systems, an electric vehicle supply equipment (EVSE) is connected between the charge adapter and an external power source.

In a further non-limiting embodiment of any of the foregoing charging systems, the charge adapter is configured to expand the EVSE from a single plug device to a multi-plug device.

In a further non-limiting embodiment of any of the foregoing charging systems, the EVSE includes a coupler portion, a plug portion, a control box, a first cable connecting between the coupler portion and the control box, and a second cable extending between the plug portion and the control box.

In a further non-limiting embodiment of any of the foregoing charging systems, the charge adapter includes a coupler portion configured to connect to the coupler portion of the EVSE, the first charge coupler configured to plug into the first inlet port, the second charge coupler configured to plug into the second inlet port, a first cable connecting between the coupler portion of the charge adapter and the first charge coupler, and a second cable connecting between the coupler portion of the charge adapter and the second charge coupler.

A charging system for an electrified vehicle according to another exemplary aspect of the present disclosure includes, among other things, a traction battery pack, an electrical divider system configured to partition the traction battery pack into a first partition and a second partition that are separately chargeable and electrically isolated from one another, a first charge port assembly, a second charge port assembly, a charge adapter, and a control module programmed to a command the electrical divider system to transition between a first state in which the first partition and the second partition are coupled and a second state in which the first partition and the second partition are decoupled when the charge adapter is connected to the first charge port assembly and the second charge port assembly.

In a further non-limiting embodiment of the foregoing charging system, the charge adapter includes a first charge coupler configured to connect to a first inlet port of the first charge port assembly and a second charge coupler configured to connect to a second inlet port of the second charge port assembly.

In a further non-limiting embodiment of either of the foregoing charging systems, the first inlet port is operably connected to the first partition, and the second inlet port is operably connected to the second partition.

In a further non-limiting embodiment of any of the foregoing charging systems, the charge adapter includes a coupler portion, a first charge coupler configured to plug into the first charge port assembly, a second charge coupler configured to plug into the second charge port assembly, a first cable connecting between the coupler portion and the first charge coupler, and a second cable connecting between the coupler portion and the second charge coupler.

In a further non-limiting embodiment of any of the foregoing charging systems, an electric vehicle supply equipment (EVSE) is connected between the charge adapter and an external power source. The coupler portion of the charge adapter is connectable to a coupler portion of the EVSE.

In a further non-limiting embodiment of any of the foregoing charging systems, the EVSE includes the coupler portion, a plug portion, a control box, a first cable connecting between the coupler portion and the control box, and a second cable extending between the plug portion and the control box.

In a further non-limiting embodiment of any of the foregoing charging systems, the charge adapter is configured to expand the EVSE from a single plug device to a multi-plug device.

In a further non-limiting embodiment of any of the foregoing charging systems, the charge control module is further programmed to determine an amount of charge current being received from an external power source and to split the charge current received from the external power source evenly between the first partition and the second partition.

In a further non-limiting embodiment of any of the foregoing charging systems, the charge control module is further programmed to command the electrical divider system to transition from the second state to the first state when the first partition and the second partition are charged to a predefined charging capacity.

In a further non-limiting embodiment of any of the foregoing charging systems, the first partition includes a first battery array and the second partition includes a second battery array.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to electrified vehicle charging systems that are equipped with multiple charging interfaces. An exemplary charging system may include a charge adapter for allowing a single charge plug/connector/coupler to be split into multiple charge plugs/connectors/couplers for simultaneously utilizing each charging interface for charging a traction battery pack of the electrified vehicle. Use of the charge adapter can reduce charging times when only a single charge plug is available at a charging station. These and other features of this disclosure are discussed in greater detail in the following paragraphs of this detailed description.

Figure 1:
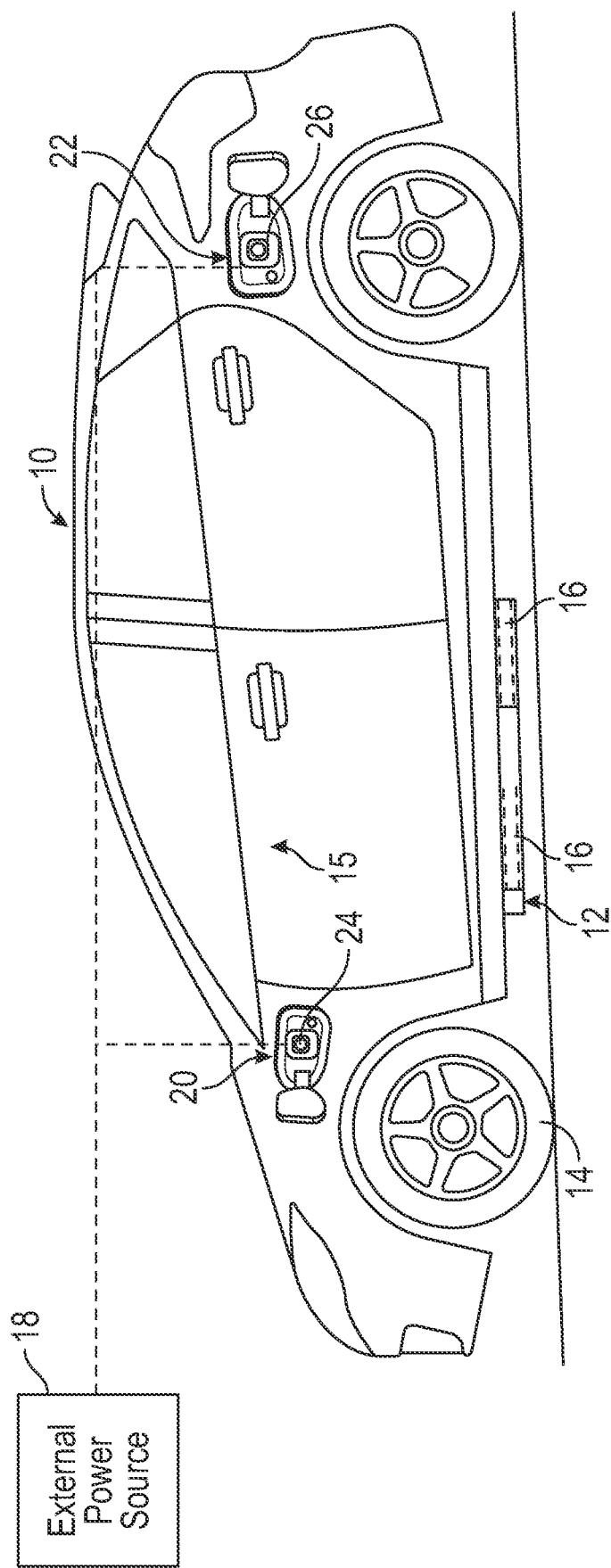
FIG. 1 is a side view of an electrified vehicle equipped with a charging system that includes multiple charging interfaces.

FIG. 1 schematically illustrates an exemplary electrified vehicle 10 that includes a traction battery pack 12. The electrified vehicle 10 may include any electrified powertrain capable of applying a torque from an electric machine (e.g., an electric motor, not shown) for driving one or more drive wheels 14 of the electrified vehicle 10. In an embodiment, the electrified vehicle 10 is a plug-in hybrid electric vehicle (PHEV). In another embodiment, the electrified vehicle is a battery electric vehicle (BEV). Therefore, the powertrain may electrically propel the drive wheels 14 either with or without the assistance of an internal combustion engine.

The electrified vehicle 10 of FIG. 1 is schematically illustrated as a car. However, the teachings of this disclosure may be applicable to any type of vehicle, including but not limited to, cars, trucks, vans, sport utility vehicles (SUVs), etc.

Although shown schematically, the traction battery pack 12 may be a high voltage traction battery pack that includes a plurality of battery arrays 16 (e.g., battery assemblies or groupings of battery cells) capable of outputting electrical power to one or more electric machines of the electrified vehicle 10. Other types of energy storage devices and/or output devices may also be used to electrically power the electrified vehicle 10.

From time to time, charging the energy storage devices of the traction battery pack 12 may be required or desired. The electrified vehicle 10 may therefore be equipped with a charging system 15 for charging the energy storage devices (e.g., battery cells) of the traction battery pack 12. As will become further evident from the teachings below, the charging system 15 may include charging components located both onboard and offboard the electrified vehicle 10.

The charging system 15 may be operably connected to an external power source 18 for receiving and distributing power to the battery cells of the traction battery pack 12. In an embodiment, the external power source 18 includes utility grid power. In another embodiment, the external power source 18 includes an alternative energy source, such as solar power, wind power, etc. In yet another embodiment, the external power source 18 includes a combination of utility grid power and alternative energy sources. The external power source 18 may be accessed at a home of the user, a public charging station, etc.

The charging system 15 may include multiple onboard charging interfaces that are configured to contribute to charging the traction battery pack 12. In an embodiment, the charging system 15 is a dual charge port system that includes a first charge port assembly 20 and a second charge port assembly 22. The first and second charge port assemblies 20, 22 may sometimes be referred to as vehicle inlet assemblies. Although two charge ports are illustrated in FIG. 1, the electrified vehicle 10 could include two or more charging interfaces within the scope of this disclosure.

Electric vehicle supply equipment (EVSE) (e.g., charge cords/plugs/couplers) may be operably connected between the external power source 18 and one or more of the first and second charge port assemblies 20, 22 for transferring power therebetween. The EVSE may be operably connected to a first inlet port 24 of the first charge port assembly 20 and/or to a second inlet port 26 of the second charge port assembly 22 to charge the traction battery pack 12 of the electrified vehicle 10 using power originating from the external power source 18.

The second charge port assembly 22 may be disposed either on the same side or a different side of the electrified vehicle 10 relative to the first charge port assembly 20. In the illustrated embodiment, the first charge port assembly 20 is provided near a front portion of the vehicle, and the second charge port assembly 22 is a separate assembly that is located near a rear portion of the vehicle. However, other configurations are also contemplated herein. For example, the first and second inlet ports 24, 26 could be packaged as different ports of the same charge port assembly.

The first and second inlet ports 24, 26 may be configured to receive AC power, DC power, or both from the external power source 18. The charging system 15 may thus be configured to provide any level of charging (e.g., Level 1, Level 2, DC, etc.).

Many charging stations may only have a single EVSE (e.g., a single charge cord/plug/coupler) available for use. In such cases, unless two separate charging stations are available, users may be limited to charging the traction battery pack 12 through only one of the first charge port assembly 20 or the second charge port assembly 22. These limitations can undesirably lengthen charging times. This disclosure therefore describes charging systems that include a charge adapter for allowing a single charge cord/plug/coupler to be split into multiple charge cords/plugs/couplers for simultaneously utilizing each of the multiple charging interfaces of the electrified vehicle 10 when charging the traction battery pack 12.

Figure 2:
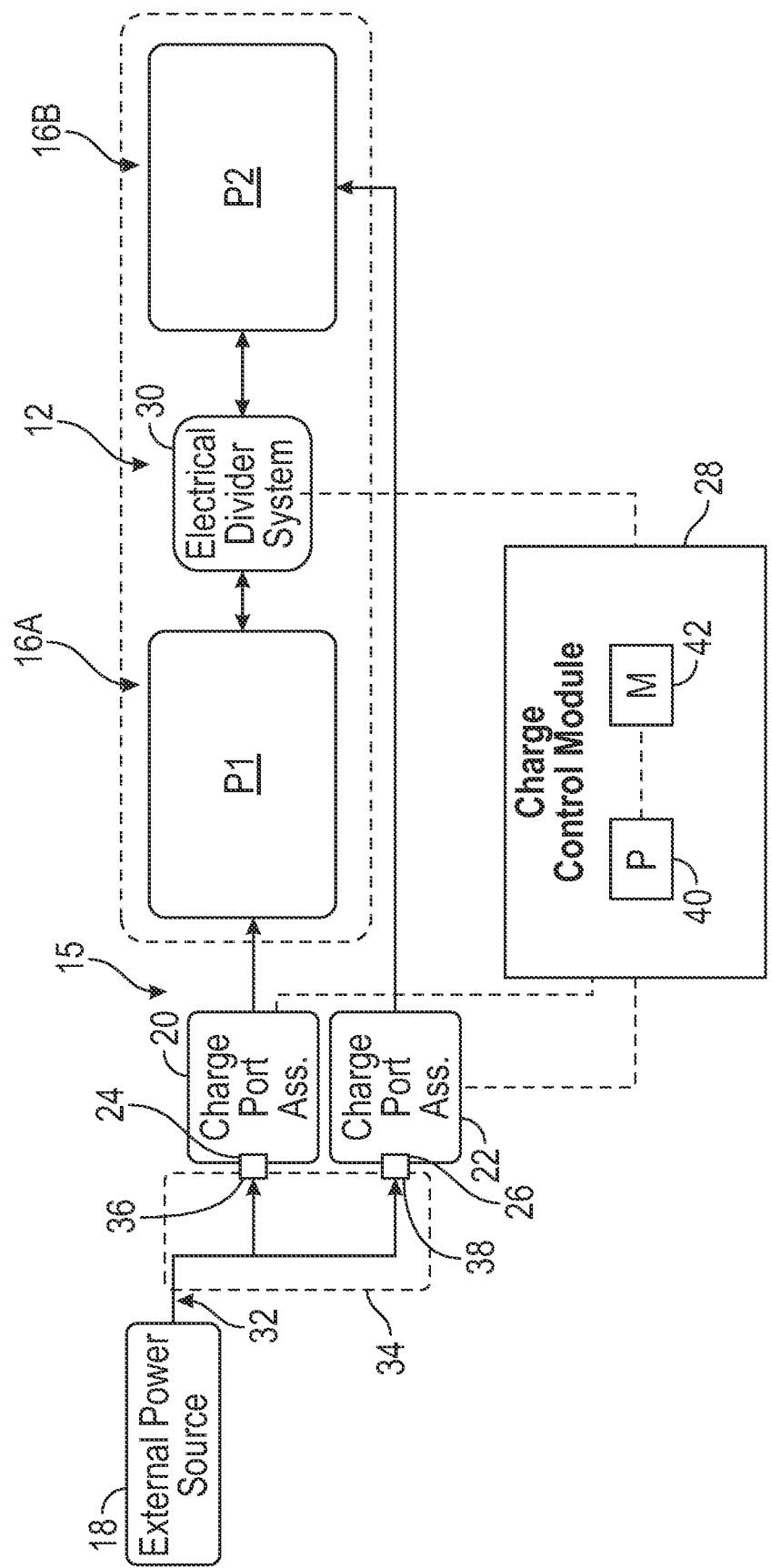
FIG. 2 is a block diagram of an electrified vehicle charging system that includes multiple charging interfaces and a charge adapter.

The exemplary charging system 15 of the electrified vehicle 10 of FIG. 1 is further illustrated in the highly schematic depiction of FIG. 2. In the exemplary embodiment, the traction battery pack 12 includes a first battery array 16A and a second battery array 16B. However, the traction battery pack 12 could include two or more battery arrays within the scope of this disclosure.

The charging system 15 may include a charge control module 28 that is programmed to control the functionality of the charging system 15. The charge control module 28 can include a microcontroller unit (MCU). The charge control module 28 could include a single controller module, or may be established by selected portions of a plurality of separate controller modules. The charge control module 28 used in connection with the charging system 15 may be, for example, a Battery Charge Control Module (BCCM), a Battery Energy Control Module (BECM), or both.

The charge control module 28 may include a processing unit 40 and non-transitory memory 42 for executing the various control strategies and modes of the charging system 15. The charge control module 28 may be configured to receive various inputs, analyze these inputs, and then command various operations of the charging system 15.

The processing unit 40 can be a custom made or commercially available processor, a central processing unit (CPU), or generally any device for executing software instructions. The memory 42 can include any one or combination of volatile memory elements and/or nonvolatile memory elements. The processing unit 40 may be configured to execute one or more programs stored in the memory 42. The programs may be stored in the memory 42 as software code and can include one or more additional or separate programs, each of which includes an ordered list of executable instructions for implementing logical functions associated with the charging system 15.

One exemplary program stored in the memory 42 of the charge control module 28 may be configured for electrically decoupling the first battery array 16A from the second battery array 16B during charging operations. An electrical divider system 30 of the charging system 15 may be selectively controlled by the charge control module 28 to electrically decouple the first battery array 16A from the second battery array 16B. In an embodiment, the electrical divider system 30 includes one or more switches, contactors, and/or isolators that may be transitioned in response to commands from the charge control module 28 to electrically decouple the first battery array 16A from the second battery array 16B. The charge control module 28 may receive data about the battery arrays 16A, 16B from various sensors or other measurement devices associated with the traction battery pack 12. The data can be analyzed using programs executed on the charge control module 28 to assess various characteristics of each battery array, including but not limited to state of charge (SOC), voltage imbalances, temperatures, time in service, etc.

Electrically decoupling the first battery array 16A from the second battery array 16B partitions the traction battery pack 12 into a plurality of partitions P1 and P2. Because the partition P1, which includes the first battery array 16A in this embodiment, is electrically decoupled from the partition P2, which includes the second battery array 16B in this embodiment, the partitions P1 and P2 can be considered separately chargeable from one another.

The traction battery pack 12 could be partitioned into separately chargeable partitions in ways other than the specific configuration shown in FIG. 2. Moreover, the traction battery pack 12 could be partitioned into greater than two partitions within the scope of this disclosure.

The first charge port assembly 20 may be operably connected to the partition P1 for charging, and the second charge port assembly 22 may be operably connected to the partition P2 for charging. When charging the traction battery pack 12 is desired, an EVSE 32 (e.g., a charge cord/plug/coupler) may be connected to the external power source 18, and a charge adapter 34 may be connected between the EVSE 32 and each of the first and second charge port assemblies 20, 22. The charge adapter 34 may be configured to allow the single EVSE 32 to be used for charging the traction battery pack 12 through both the first charge port assembly 20 and the second charge port assembly 22. In an embodiment, a first charge coupler 36 of the charge adapter 34 may be electrically connected to the first inlet port 24 of the first charge port assembly 20, and a second charge coupler 38 of the charge adapter 34 may be electrically connected to the second inlet port 26 of the second charge port assembly 22 to charge the traction battery pack 12.

In response to the first charge coupler 36 being coupled to the first inlet port 24 and the second charge coupler 38 being coupled to the second inlet port 26, the charge control module 28 may command the electrical divider system 30 to transition to a state that partitions the traction battery pack 12 into the partitions P1 and P2. The charge control module 28 may then direct that charge power be delivered from the first charge port assembly 20 to the partition P1 and may further direct that charge power be delivered from the second charge port assembly 22 to the partition P2.

In an embodiment, the charge control module 28 may be configured to determine the amount of charge current being received from the external power source and may further be configured to split the charge current received from the external power source 18 evenly between the partition P1 and the partition P2 of the traction battery pack 12. In another embodiment, the charge control module 28 may control the charging system 15 such that each partition P1, P2 is charged at or near its maximum allowable charge rate. After charging the partitions P1 and P2 to their predefined charging capacities (e.g., 100% SOC), the charge control module 28 may command the electrical divider system 30 to transition back to a state that electrically couples the partitions P1 and P2 together.

The charge adapter 34 may enable multiple vehicle level control functions related to the traction battery pack 12.

Exemplary control functions may include but are not limited to (1) thermal management of partitions of the traction battery pack 24, (2) ability to manage battery degradation on split partitions based on calibratable degradation curves, (3) quick top-up charging capability utilizing maximum voltage and current from EVSE for short periods of time, (4) Under and Over voltage protection, and (5) battery trickle charging system capability when traction battery pack 12 is being discharged.

Figure 3A:
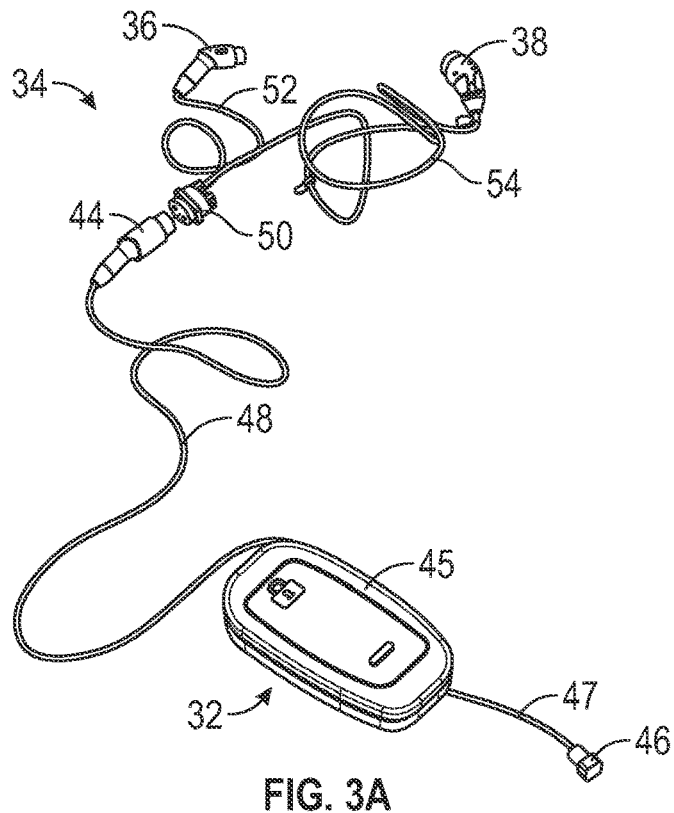
FIGS. 3A and 3B illustrate an exemplary charge adapter of the charging system of FIG. 2.
Figure 3B:
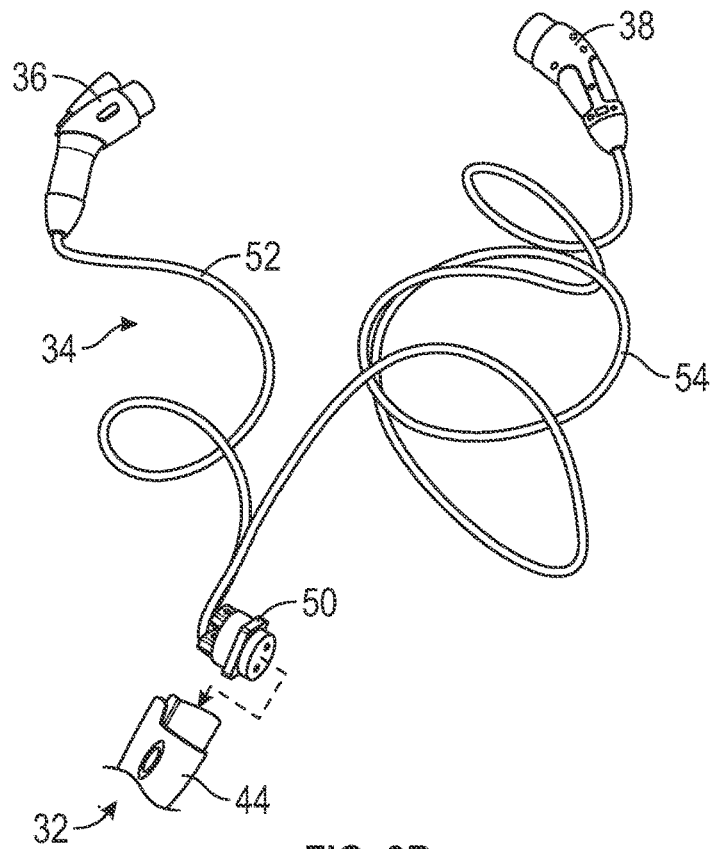

FIGS. 3A and 3B, with continued reference to FIGS. 1 and 2, illustrate additional details of the EVSE 32 and the charge adapter 34 discussed above. The illustrated features are exemplary only, and thus the EVSE 32 and the charge adapter 34 could embody slightly different configurations and still fall within the scope of this disclosure.

The EVSE 32 may include a coupler portion 44, a plug portion 46, a control box 45, a first cable 48 connecting between the coupler portion 44 and the control box 45, and a second cable 47 extending between the plug portion 46 and the control box 45. In an embodiment, the coupler portion 44 is configured for connecting to the charge adapter 34, and the plug portion 46 is configured for connecting to a power outlet, charging station, or other structure associated with accessing the external power source 18.

The control box 45 may sometimes be referred to as a continuous current interruption device (CCID). The control box 45 may include various fuses, relays, transformers, sensors, and other components for detecting charging faults during use of the EVSE 32. The control box 45 may also be equipped with various circuit boards and/or control modules that have processing capabilities for communicating with other components, such as the charge adapter 34 and the external power source 18, for example.

The charge adapter 34 may include a coupler portion 50, the first charge coupler 36, the second charge coupler 38, a first cable 52, and a second cable 54. The coupler portion 50 may be configured to connect to the coupler portion 44 of the EVSE 32, thereby expanding the EVSE 32 from a single plug device to a multi-plug device. The first cable 52 may connect between the coupler portion 50 and the first charge coupler 36, and the second cable 54 may connect between the coupler portion 50 and the second charge coupler 38. As referenced above, the first charge coupler 36 is configured for plugging into the first inlet port 24 of the first charge port assembly 20, and the second charge coupler 38 is configured for plugging into the second inlet port 26 of the second charge port assembly 22.

Figure 4:
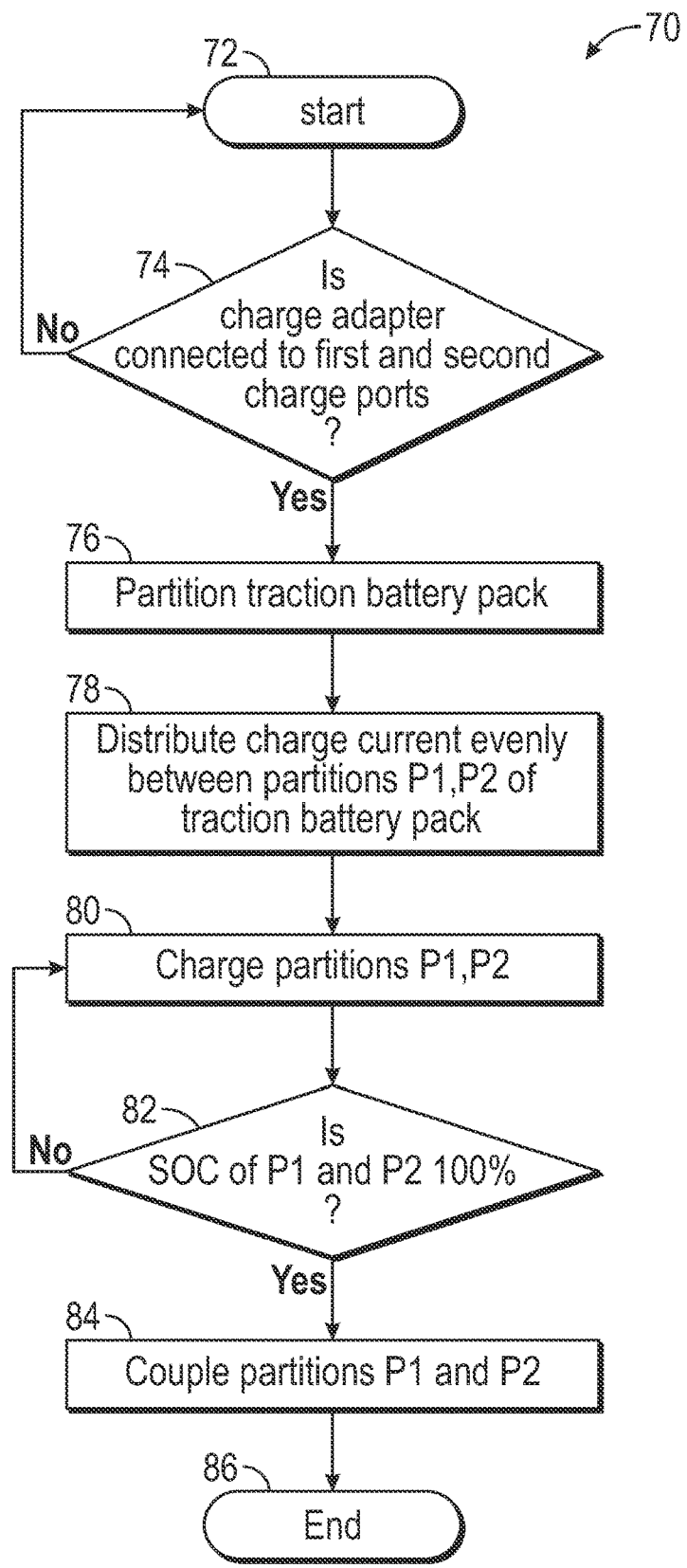
FIG. 4 schematically illustrates an exemplary method for controlling charging of an electrified vehicle equipped with multiple charging interfaces and a charge adapter.

FIG. 4, with continued reference to FIGS. 1-3, schematically illustrates an exemplary method 70 for controlling the charging of an electrified vehicle 10 that is equipped with multiple charging interfaces (e.g., both the first charge port assembly 20 and the second charge port assembly 22.) and the charge adapter 34. In an embodiment, the processing unit 40 of the charge control module 28 may be programmed with one or more algorithms adapted to execute the exemplary method 70.

The exemplary method 70 may begin at block 72. At block 74, the charge control module 28 may determine whether or not the charge adapter 34 has been plugged into both the first charge port assembly 20 and the second charge port assembly 22. The charge control module 28 may make this determination based on plug status signals received from the first and second charge port assemblies 20, 22, for example.

If a "YES" flag is returned at block 74, the traction battery pack 12 may be partitioned at block 76. This step may include commanding the electrical divider system 30 to transition to a state that partitions the traction battery pack 12 into the partitions P1 and P2.

Next, at block 78, the charge control module 28 may command that the charge current received from the external power source 18 be evenly distributed between the charge port assemblies 20, 22 via the charge adapter 34. The partition P1 and the partition P2 may be simultaneously charged at block 80 via charge power received from the first charge port assembly 20 and the second charge port assembly 22, respectively.

At block 82, the method 70 may determine whether the SOC of each of the partition P1 and the partition P2 has reached 100%, or full capacity. If YES, the method 70 may then electrically couple the partitions P1 and P2 back together at block 84. This step may include commanding the electrical divider system 30 to transition back to the state in which the partitions P1 and P2 are electrically coupled to one another. The method 70 may then end at block 86.

The charging systems of this disclosure are equipped with a charge adapter configured for permitting a single EVSE charge cord/plug/coupler to be split into multiple charge cords/plugs/couplers for utilizing each of a plurality of vehicle charging interfaces simultaneously when charging a vehicle traction battery pack. The disclosed charging systems reduce charging times and allow for more flexible charging locations to be implemented within the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charging system for an electrified vehicle, comprising:
   a traction battery pack including a first partition and a second partition;
   a first charge port assembly including a first inlet port operably connected to the first partition;
   a second charge port assembly including a second inlet port operably connected to the second partition;
   a charge adapter including a first charge coupler adapted to connect to the first inlet port and a second charge coupler adapted to connect to the second inlet port; and
   an electric vehicle supply equipment (EVSE) connected between the charge adapter and an external power source,
   wherein the EVSE includes a coupler portion, a plug portion, a control box, a first cable connecting between the coupler portion and the control box, and a second cable extending between the plug portion and the control box.

2. The charging system as recited in claim 1, wherein the first partition includes a first battery array and the second partition includes a second battery array.

3. The charging system as recited in claim 1, comprising an electrical divider system configured to divide the traction battery pack into the first partition and the second partition, wherein the first partition and the second partition are separately chargeable and electrically isolated from one another when divided by the electrical divider system.

4. The charging system as recited in claim 3, comprising a charge control module programmed to command the electrical divider system to transition between a first state in which the first partition and the second partition are coupled and a second state in which the first partition and the second partition are decoupled.

5. The charging system as recited in claim 4, wherein the charge control module is further programmed to determine an amount of charge current being received from an external power source and to split the charge current received from the external power source evenly between the first partition and the second partition.

6. The charging system as recited in claim 4, wherein the charge control module is further programmed to command the electrical divider system to transition from the second state to the first state when the first partition and the second partition are charged to a predefined charging capacity.

7. The charging system as recited in claim 1, wherein the charge adapter is configured to expand the EVSE from a single plug device to a multi-plug device.

8. The charging system as recited in claim 7, wherein the charge adapter includes a coupler portion configured to connect to the coupler portion of the EVSE, the first charge coupler configured to plug into the first inlet port, the second charge coupler configured to plug into the second inlet port, a first cable connecting between the coupler portion of the charge adapter and the first charge coupler, and a second cable connecting between the coupler portion of the charge adapter and the second charge coupler.

9. A charging system for an electrified vehicle, comprising:
   a traction battery pack;
   an electrical divider system configured to partition the traction battery pack into a first partition and a second partition that are separately chargeable and electrically isolated from one another;
   a first charge port assembly;
   a second charge port assembly;
   a charge adapter; and
   a charge control module programmed to a command the electrical divider system to transition between a first state in which the first partition and the second partition are coupled and a second state in which the first partition and the second partition are decoupled when the charge adapter is connected to the first charge port assembly and the second charge port assembly,
   wherein the charge adapter includes a coupler portion, a first charge coupler configured to plug into the first charge port assembly, a second charge coupler configured to plug into the second charge port assembly, a first cable connecting between the coupler portion and the first charge coupler, and a second cable connecting between the coupler portion and the second charge coupler.

10. The charging system as recited in claim 9, wherein the charge adapter includes a first charge coupler configured to connect to a first inlet port of the first charge port assembly and a second charge coupler configured to connect to a second inlet port of the second charge port assembly.

11. The charging system as recited in claim 10, wherein the first inlet port is operably connected to the first partition, and the second inlet port is operably connected to the second partition.

12. The charging system as recited in claim 9, comprising an electric vehicle supply equipment (EVSE) connected between the charge adapter and an external power source, and wherein the coupler portion of the charge adapter is connectable to a coupler portion of the EVSE.

13. The charging system as recited in claim 12, wherein the EVSE includes the coupler portion, a plug portion, a control box, a first cable connecting between the coupler portion and the control box, and a second cable extending between the plug portion and the control box.

14. The charging system as recited in claim 12, wherein the charge adapter is configured to expand the EVSE from a single plug device to a multi-plug device.

15. The charging system as recited in claim 9, wherein the charge control module is further programmed to determine an amount of charge current being received from an external power source and to split the charge current received from the external power source evenly between the first partition and the second partition.

16. The charging system as recited in claim 15, wherein the charge control module is further programmed to command the electrical divider system to transition from the second state to the first state when the first partition and the second partition are charged to a predefined charging capacity.

17. The charging system as recited in claim 9, wherein the first partition includes a first battery array and the second partition includes a second battery array.

* * * * *